(12) United States Patent
Dotan et al.

(10) Patent No.: US 12,089,542 B2
(45) Date of Patent: Sep. 17, 2024

(54) SUBSURFACE DRIP IRRIGATION (SDI) LINES ENHANCED WITH ESSENTIAL OILS

(71) Applicant: Metzerplas Cooperative Agricultural Organization Ltd., M.P. Heffer, IL (US)

(72) Inventors: Ana Dotan, Ramat Gan (IL); Tal Balboul, Ramat Gan (IL); Amos Ophir, Zikhron Ya'akov (IL)

(73) Assignee: Metzerplas Cooperative Agricultural Org. Ltd., M.P. Heffer (IL)

( * ) Notice: Subject to any disclaimer, the term of this patent is extended or adjusted under 35 U.S.C. 154(b) by 0 days.

(21) Appl. No.: 18/013,940

(22) PCT Filed: Jun. 20, 2021

(86) PCT No.: PCT/IL2021/050745
§ 371 (c)(1),
(2) Date: Dec. 30, 2022

(87) PCT Pub. No.: WO2022/003670
PCT Pub. Date: Jan. 6, 2022

(65) Prior Publication Data
US 2023/0200315 A1    Jun. 29, 2023

(30) Foreign Application Priority Data
Jun. 30, 2020  (IL) .......................................... 275753

(51) Int. Cl.
*A01G 25/06*   (2006.01)
*A01N 31/08*   (2006.01)
(Continued)

(52) U.S. Cl.
CPC ............. *A01G 25/06* (2013.01); *A01N 31/08* (2013.01); *A01P 21/00* (2021.08); *A01G 2025/006* (2013.01)

(58) Field of Classification Search
CPC ... A01G 25/06; A01G 2025/006; E02B 11/00; E02B 11/005; A01P 21/00; A01N 31/08
See application file for complete search history.

(56) References Cited

U.S. PATENT DOCUMENTS 5,332,160 A * 7/1994 Ruskin .................. F16L 11/045
                                                       138/137
6,821,928 B2   11/2004 Ruskin
(Continued)

FOREIGN PATENT DOCUMENTS

AU   2014395071 A1 * 12/2016 ............. A01G 25/06
CN   108192186 A    6/2018
(Continued)

OTHER PUBLICATIONS

Efrati, R. et al., "The Combined Effect of Additives and Processing on the Thermal Stability and Controlled Release of Essential Oils in Antimicrobial Films", Journal of Applied Polymer Science, vol. 131, Issue 15, (2014).
(Continued)

*Primary Examiner* — Frederick L Lagman
(74) *Attorney, Agent, or Firm* — FENWICK & WEST LLP

(57) ABSTRACT

A subsurface drip irrigation (SDI) pipe including a polymer water conduit with drippers spaced along a length of its wall and one or more essential oils (EO) adsorbed to a nanoclay (NC)/polymer structure so that EO is delivered to soil surrounding the SDI pipe.

16 Claims, 22 Drawing Sheets

(51) Int. Cl.
  *A01P 21/00* (2006.01)
  *A01G 25/00* (2006.01)

(56) References Cited

U.S. PATENT DOCUMENTS

| | | | |
|---|---|---|---|
| 9,210,926 B2 | 12/2015 | Markus et al. | |
| 2003/0092817 A1* | 5/2003 | Ruskin | A01G 25/02 523/122 |
| 2009/0250137 A1* | 10/2009 | Ruskin | C08L 23/06 138/146 |
| 2015/0257381 A1 | 9/2015 | Ophir et al. | |
| 2016/0330918 A1 | 11/2016 | Ruskin et al. | |
| 2017/0118931 A1* | 5/2017 | Cresswell | A01G 29/00 |
| 2017/0327606 A1* | 11/2017 | Habibi | C08K 3/04 |

FOREIGN PATENT DOCUMENTS

| | | | | |
|---|---|---|---|---|
| CN | 109561662 A | * | 4/2019 | A01G 13/0275 |
| ES | 2901715 A1 | * | 3/2022 | A01G 13/0275 |
| WO | WO 2015/176100 A1 | | 11/2015 | |

OTHER PUBLICATIONS

Efrati, R. et al., "The Effect of Polyethylene Crystallinity and Polarity on Thermal Stability and Controlled Release of Essential Oils in Antimicrobial Films", Journal of Applied Polymer Science, vol. 131, Issue 11, (2014).

Moshe, E. et al., "Multiphase Thermoplastic Hybrid for Controlled Release of Antimicrobial Essential Oils in Active Packaging Film", Polymers for Advanced Technologies, Springer, doi: 10.1002/pat.3817, (2016).

Dvir, E.M. et al., "Antimicrobial Active Packaging Combining Essential Oils Mixture: Migration and Odor Control Study", https://doi.org/10.1002/pat.4642, Polymers for Advanced Technologies, Springer, (2019).

PCT International Search Report and Written Opinion, PCT Application No. PCT/IL2021/050745, Sep. 9, 2021, 11 pages.

PCT International Preliminary Report on Patentability, PCT Application No. PCT/IL2021/050745, Sep. 6, 2022, 11 pages.

* cited by examiner

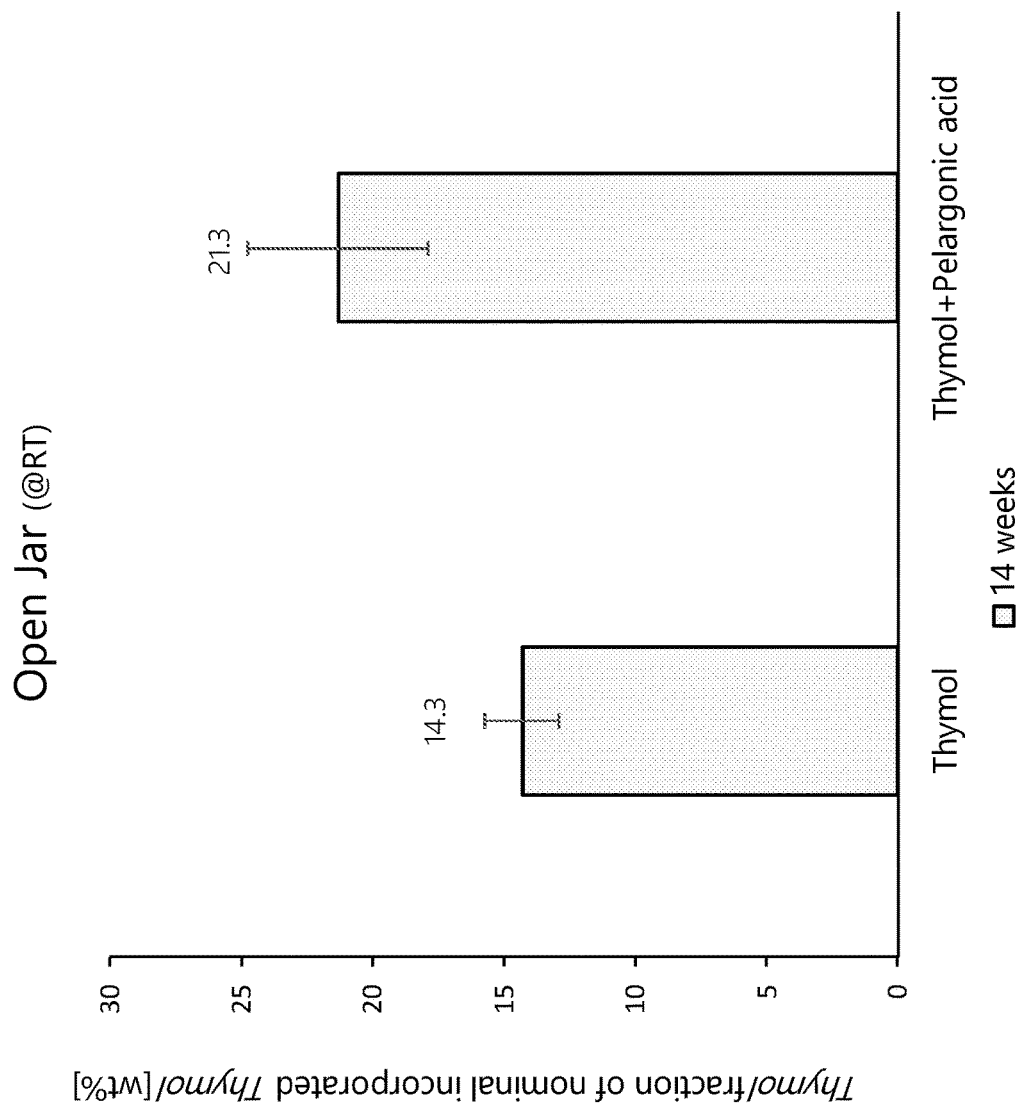

SUBSURFACE DRIP IRRIGATION (SDI) LINES ENHANCED WITH ESSENTIAL OILS

DETAILS OF RELATED APPLICATIONS

This application claims priority from IL 275753 filed on Jun. 30, 2020, having the same title and Applicant as the present application, said earlier application is fully incorporated herein by reference.

FIELD OF THE INVENTION

The invention is in the field of drip irrigation equipment.

BACKGROUND OF THE INVENTION

Drip irrigation (DI) systems are widely acknowledged as more efficient than other irrigation system types. DI systems are used for lawns, gardens, landscapes and in commercial agriculture. DI systems are simple, requiring only a pipe with tiny open holes to allow the water to trickle out at a constant rate. Since DI systems apply water directly to the target evaporation losses are lower than in other irrigation systems.

In a subsurface drip irrigation (SDI) system the DI pipe is installed underground rather than aboveground. SDI systems are currently used both in commercial mechanized agriculture as well as landscaping and gardening. Evaporation losses are even lower than in conventional DI systems.

A special application of SDI systems is the provided ability to irrigate with recycled waste-water, avoiding odors and potential pathogens contact.

Both DI and SDI systems are amenable to operation by electronic control circuitry, simplifying management of land under cultivation.

In SDI systems root penetration into drippers through the water exit hole can lead to obstruction. Even if roots do not penetrate into the dripper intense growth in the area of the water exit hole could lead to obstruction of water passage rendering the dripperineffective. Mechanical protection, or chemical non-diffusive action, may protect the inside passages of the emitter, but not the exit hole area, which is the critical and weakest point.

Roots penetration or clogging occurs only during prolonged irrigation intervals, since when the surrounding soil is wet, roots are not pressured to seek additional moisture. For this reason, the alternative approach of diluting herbicides in the water flow will not provide protection, and roots could still penetrate and clog the SDI pipes and/or drippers.

Essential oils (EOs) are oils derived from plants. Among the plant families used as a source of EOs are the *Lamiaceae*, which includes the species *Mentha, Salvia, Origanum*, and *Thyme* spp. Many EOs are classified as Generally Recognized As Safe (GRAS), and they confer the characteristic(s) for which aromatic plants are used in the pharmaceutical, food, and fragrance industries.

SUMMARY OF THE INVENTION

A broad aspect of the invention relates to reducing or avoiding intrusion of roots into DI pipelines in an SDI system without using an herbicide. For purposes of this specification and the accompanying claims, the term "herbicide" includes dinitro-anilines (e.g.) trifluralin [TREFLAN] or pendimethalin and other synthetic chemical compounds but excludes essentials oils (EOs) such as Thymol. In some exemplary embodiments of the invention, one or more EOs are used to deflect root growth. Some exemplary embodiments of the invention provide an active solution that will work all year around, regardless the irrigation cycles, and protect both the interior passages of the dripper and the exit hole and its vicinity from root intrusion and/or accumulation.

One aspect of some embodiments of the invention relates to inclusion of one or more essential oils (EOs) in a polymer used to produce an SDI pipe or portion thereof. According to various exemplary embodiments of the invention the EOs includes Thymol and/or Carvacrol and/or Eugenol and/or Cinnamaldehyde and/or Pelargonic acid. In some embodiments Thymol is used primarily or exclusively. Alternatively or additionally, polymer used to produce the SDI pipe comprises a compatibilized blend of polyethylene with polyamide and includes nanoclay (NC). Optionally, the masterbatch containing the NC is foamed to increase porosity. In some embodiments the EO is combined with additional active ingredients.

A second aspect of some embodiments of the invention relates to a production method for SDI pipes which incorporates one or more EOs into the polymer of a portion of the pipe. In some exemplary embodiments of the invention, only a portion of the polymer of the pipe contains an EO. Optionally, this contributes to a reduction in diffusion of the EO through said wall at places not adjacent to dripper openings. According to various exemplary embodiments of the invention the polymer wall and/or dripper comprises a non-diffusion barrier Polyamide (PA) or any other material impervious to gas transmission and/or Polyethylene (PE). Optionally, the PE is linear low-density polyethylene (LLDPE). In some embodiments, the method includes, preparing granules of polymer and NC, absorption of the EO onto the granules, and extrusion to form sheets or tubes.

A third aspect of some embodiments of the invention relates to SDI pipes which release EOs into the soil. In some embodiments release of EOs is by direct diffusion of the EO from the polymer of the pipe wall into the soil. Alternatively or additionally, in some embodiments of the invention, release of EOs is by diffusion of the EO from the polymer of the pipe wall to water flowing through the pipe. According to these embodiments the EO is released into the soil together with the water flowing out of the pipe.

It will be appreciated that the various aspects described above relate to solution of technical problems associated with root invasion of SDI pipes.

Alternatively or additionally, it will be appreciated that the various aspects described above relate to solution of technical problems related to reducing the amount of chemical herbicides used in SDI systems to reduce root invasion.

In some exemplary embodiments of the invention there is provided a subsurface drip irrigation (SDI) pipe including: a polymer water conduit with drippers spaced along a length of its wall; and one or more essential oils (EO) adsorbed to a nanoclay (NC)/polymer structure so that EO is delivered to soil surrounding the SDI pipe. In some embodiments the wall of the conduit includes the nanoclay (NC)/polymer with EO adsorbed thereto. Alternatively or additionally, in some embodiments the nanoclay (NC)/polymer with EO adsorbed thereto is inserted as a film surrounded by the wall of the conduit. Alternatively or additionally, in some embodiments the nanoclay (NC)/polymer with EO adsorbed thereto is applied as a coating to an inner side of the wall of the conduit. Alternatively or additionally, in some embodiments one or more drippers of the SDI pipe comprise nanoclay (NC)/polymer with EO adsorbed thereto. Alternatively or additionally, in some embodiments the nanoclay (NC)/polymer with EO adsorbed thereto is applied as a coating to an outer side of the wall of the conduit. Alternatively or additionally, in some embodiments the nanoclay (NC)/polymer with EO adsorbed thereto comprising 5% or more EO. Alternatively or additionally, in some embodiments the nanoclay (NC)/polymer with EO adsorbed thereto comprising 10% or less EO. Alternatively or additionally, in some embodiments the EO includes one or more members of the group consisting of Thymol, Carvacrol, Eugenol, Pelargonic acid and Cinnamaldehyde. Alternatively or additionally, in some embodiments the EO includes Thymol. Alternatively or additionally, in some embodiments the entire pipe is free of herbicides.

Some exemplary embodiments of the invention relate to use of an essential oil (EO) to mitigate root invasion in drippers of a subsurface drip irrigation (SDI) pipe. In some embodiments the EO includes one or more members of the group consisting of Thymol, Carvacrol, Eugenol, Pelargonic acid and Cinnamaldehyde. In some embodiments the EO includes Thymol. Alternatively or additionally, in some embodiments the use is without use of herbicides.

In some exemplary embodiments of the invention there is provided an irrigation dripper including polymer having incorporated therein one or more essential oils (EO) adsorbed to a nanoclay (NC)/polymer structure.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

Percentages (%) of chemicals (e.g. NCs, EOs and polymers) are W/W (weight per weight) unless otherwise indicated.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are:

FIG. 20A is a bar graph illustrating % of nominal EO incorporated remaining in polymeric film as a function of time for 7% thymol ARC2 and 3.5% Thymol/3.5% Pelargonic acid ARC2.

DETAILED DESCRIPTION OF EMBODIMENTS

Embodiments of the invention relate to SDI pipes which deliver one or more EOs to soil surrounding the pipe. Specifically, some embodiments of the invention can be used to mitigate root invasion of drippers installed along the length of the pipe.

The principles and operation of an SDI pipe according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Exemplary SDI Pipes

FIG. 1A, FIG. 1B, FIG. 2, and FIG. 3 are transverse cross sections of SDI pipes indicated generally as 100, 101, 200 and 300 respectively.

Figure 1A:
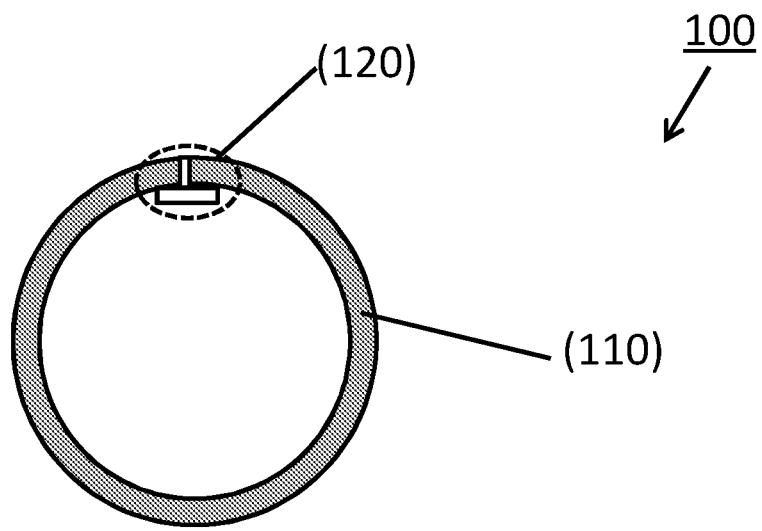
FIG. 1A is a cross section of an SDI pipe according to some embodiments of the invention.
Figure 1B:
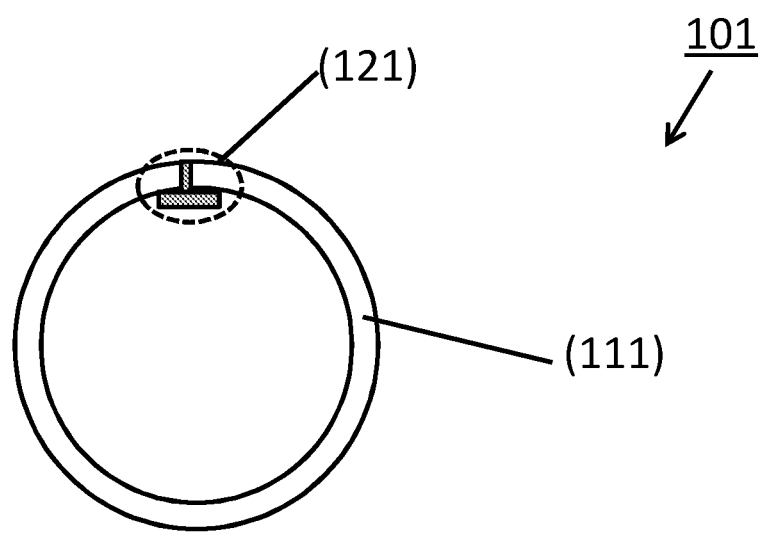
FIG. 1B is a cross section of an SDI pipe according to some embodiments of the invention.
Figure 2:
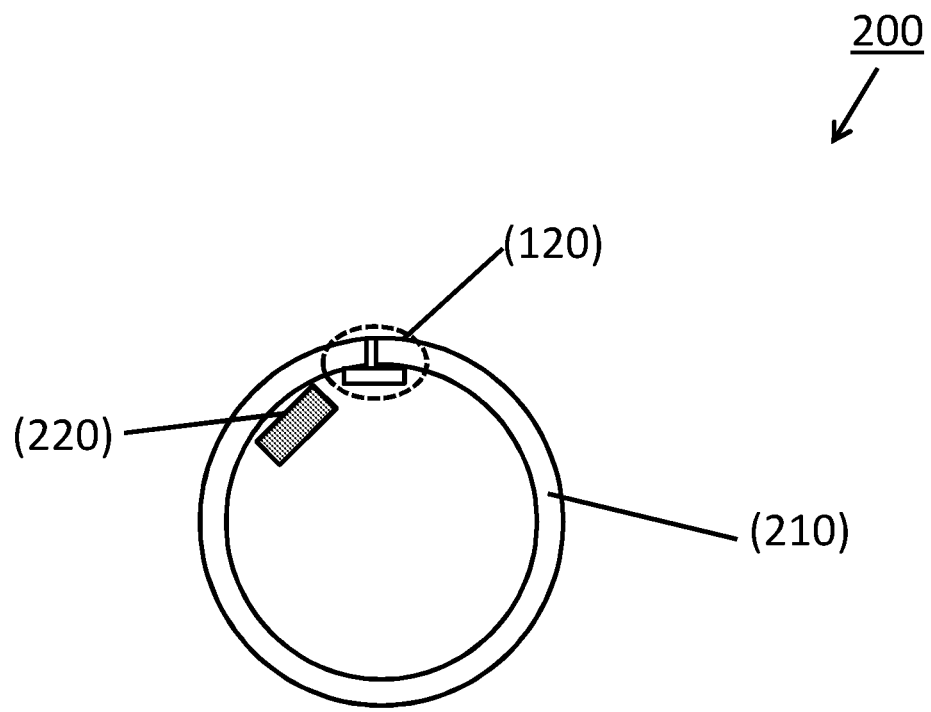
FIG. 2 is a cross section of an SDI pipe according to some embodiments of the invention.
Figure 3:
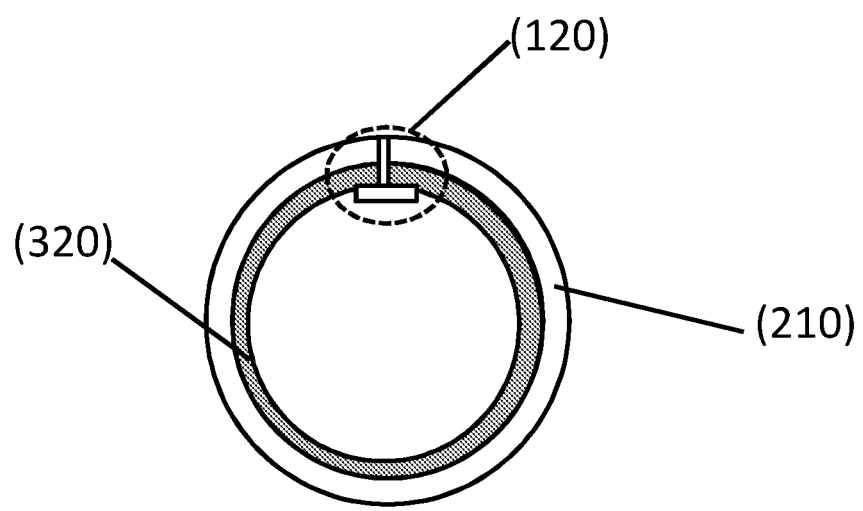
FIG. 3 is a cross section of an SDI pipe according to some embodiments of the invention.

Each of FIGS. 1 through 3 depicts an exemplary subsurface drip irrigation (SDI) pipe including a polymer water conduit (110 in FIG. 1; 210 in FIGS. 2 and 3) with drippers 120 spaced along a length of the wall. Only a single dripper is visible in each figure because they are cross sectional views.

In each of FIGS. 1 through 3, one or more essential oils (EO) are absorbed to a nanoclay (NC)/polymer structure so that EO is delivered to soil surrounding the SDI pipe when the pipe is in use (see grey shaded areas 110, 220 and 320 in FIGS. 1, 2 and 3 respectively).

In FIG. 1A, SDI pipe 100 has a wall 110 including the nanoclay (NC)/polymer with EO absorbed thereto as indicated by grey shading. In the depicted embodiment there are two modes of action: diffusion of EO out wall 110 into soil and diffusion of EO out wall 110 to water flowing through pipe 100 to be delivered to soil via drippers 120.

In FIG. 1B, SDI pipe 101 has a wall 111 without any active material. In the depicted embodiment, drippers 121 of SDI pipe 101 comprise nanoclay (NC)/polymer with EO adsorbed thereto. In the depicted embodiment the mode of action is diffusion of EO out of drippers 121 into water flowing through the drippers to be delivered to soil.

In FIG. 2, SDI pipe 200 includes a film 220 of nanoclay (NC)/polymer with EO absorbed thereto surrounded by wall 210 of conduit 200. In the depicted embodiment, the mode of action is diffusion of EO out of film 220 into water to be delivered as part of irrigation water via drippers 120.

In FIG. 3, SDI pipe 300 includes a coating 320 of nanoclay (NC)/polymer with EO adsorbed thereto (as indicated by grey shading) applied as to an inner side of wall 210 of pipe 300. In the depicted embodiment, the mode of action is diffusion of EO out of coating 320 into water to be delivered as part of irrigation water via drippers 120.

Referring again to FIG. 3, in some embodiments the layers are reversed and nanoclay (NC)/polymer with EO adsorbed thereto is applied as a coating 210 to an outer side of wall 320 of pipe 300. According to these embodiments, the mode of action is diffusion of EO out of coating 210 into soil, with no contact with water flowing inside pipe 300. It is possible that rate of diffusion may be locally influenced by water released from pipe 300 through drippers 120.

According to various exemplary embodiments of the invention the nanoclay (NC)/polymer with EO adsorbed thereto includes 5%, 6%, 7%, 8%, 9% or intermediate or greater percentages of EO at the beginning of the manufacturing process.

Alternatively or additionally, according to various exemplary embodiments of the invention the nanoclay (NC)/polymer with EO adsorbed thereto comprising 23%, 12%, 11%, 10%, 9%, 8%, 7%, 6%, 5%, or intermediate or lesser percentages of EO at the beginning of the manufacturing process.

According to various exemplary embodiments of the invention the EO includes one or more members of the group consisting of Thymol, Carvacrol, Eugenol, Pelargonic acid and Cinnamaldehyde. In some embodiments the EO includes Thymol, consists essentially of thymol or consists of thymol.

Alternatively or additionally, in some embodiments the entire pipe is free of herbicides.

Exemplary Use of EOs

In some embodiments an essential oil (EO) is used to mitigate root invasion in drippers of a subsurface drip irrigation (SDI) pipe. According to various exemplary embodiments of the invention the EO includes one or more members of the group consisting of Thymol, Carvacrol, Eugenol, Pelargonic acid and Cinnamaldehyde. Optionally, the EO includes Thymol, consists essentially of Thymol or consists of Thymol. Alternatively or additionally, in some embodiments the use excludes use of herbicides.

Exemplary Use of EO Combined with Other Active Ingredients

In other embodiments, an essential oil (EO) is combined with another active ingredient to mitigate root invasion in drippers of an SDI pipe. Suitable active ingredients include, but are not limited to: organic acids (e.g. acetic acid and citric acid), fatty acids (soaps) or salts of fatty acids such as pelargonic acid, ammonium nonanoate, and potassium salts of fatty acids; and salts such as sodium chloride or ammonium chloride. In some embodiments a mixture of acetic acid, salt, citrus oil and Eugenol is used. According to some exemplary embodiments of the invention the Thymol is combined with pelargonic acid whether synthetic or as an EO.

Exemplary Drippers

FIG. 1b depicts an irrigation dripper 121 at least partially constructed of polymer having incorporated therein one or more essential oils (EO) adsorbed to a nanoclay (NC)/polymer structure. The EO and/or nanoclay are as described for other embodiments of the invention. According to the depicted embodiment, EO (e.g. Thymol) is delivered to soil together with water flowing through dripper 121.

Exemplary Production Methods

Methods for production of polymer with nanoclay and essential oils are disclosed in US 20150257381 by Ophir et al. which is known to those of ordinary skill in the art in polymer manufacturing and is fully incorporated herein by reference.

It is expected that during the life of this patent many new dripper types will be developed and the scope of the invention is intended to include all such new technologies a priori.

As used herein the term "about" refers to ±10%.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, active agent, component, module or process is an explicit statement that additional embodiments of the invention not including the recited feature, part, component, module or process exist.

Alternatively or additionally, various exemplary embodiments of the invention exclude any specific feature, part, active agent, component, module, process or element which is not specifically disclosed herein.

Specifically, the invention has been described in the context of SDI but might also be used in other cases where root invasion is a problem.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

Additional objects, advantages, and novel features of various embodiments of the invention will become apparent to one ordinarily skilled in the art upon examination of the following examples, which do not limit the scope of the invention. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non-limiting fashion.

Example 1

Inhibition of Root Penetration in Subsurface Pipes by Thymol-Active Based Film (5%)

In order to demonstrate the inhibition of root penetration in SDI pipes by thymol-active based film, two transparent planters were made from PMMA [Poly(methyl methacrylate)] sheets with dimensions of 30 cm length, 10 cm width, and 20 cm height. Holes were drilled at the bottom for water drainage. PE pipe was specially manufactured by METZERPLAS (Israel), with a coating that prevents diffusion of materials through the PE matrix. Pipe diameter 16 mm with a wall thickness of 0.9 mm. A VARDIT 16-type adjusted dripper was selected, with a flow rate of 1.2 liters/hour for each dripper spaced 20 cm apart across the pipes, which were placed 5 cm from the planter base. An ARC1-based active film (Cloisite 15 3% wt and Thymol 5%) was inserted to one pipe [FIG. 2] and its activity was compared with another pipe with no active agent, used as a negative control.

The planting substrate was Perlite mixed with Hydroton, and mash bean seeds were sown after surface-sterilization with 10% sodium hydroxide, for 20 min, to avoid possible inhibition caused by toxins from fungi or bacteria. Seeds were then rinsed with an abundance of distilled water 20 g of seeds were sown 7 cm deep in each flowerbox.

A high ratio of seeds:volume was intentionally used to increase the chance of root intrusion.

Irrigation regimen was set at four times a day for ten minutes. The experiment was conducted in a lab, with light supplied 24 hours a day, and room temperature±25° C. After twenty days, the drippers were opened to examine whether the Thymol was able to function as an anti-root (AR) agent and protect the SDI pipe from root intrusion.

FIG. 3.3 shows the development of germination and growth of mash bean seeds. During the first four days, the germination rate of seeds sown in the reference planter (R-planter) was slower than those found in the Thymol-treated planter (T-planter), where the number of germinated seeds was greater.

Figure 4:
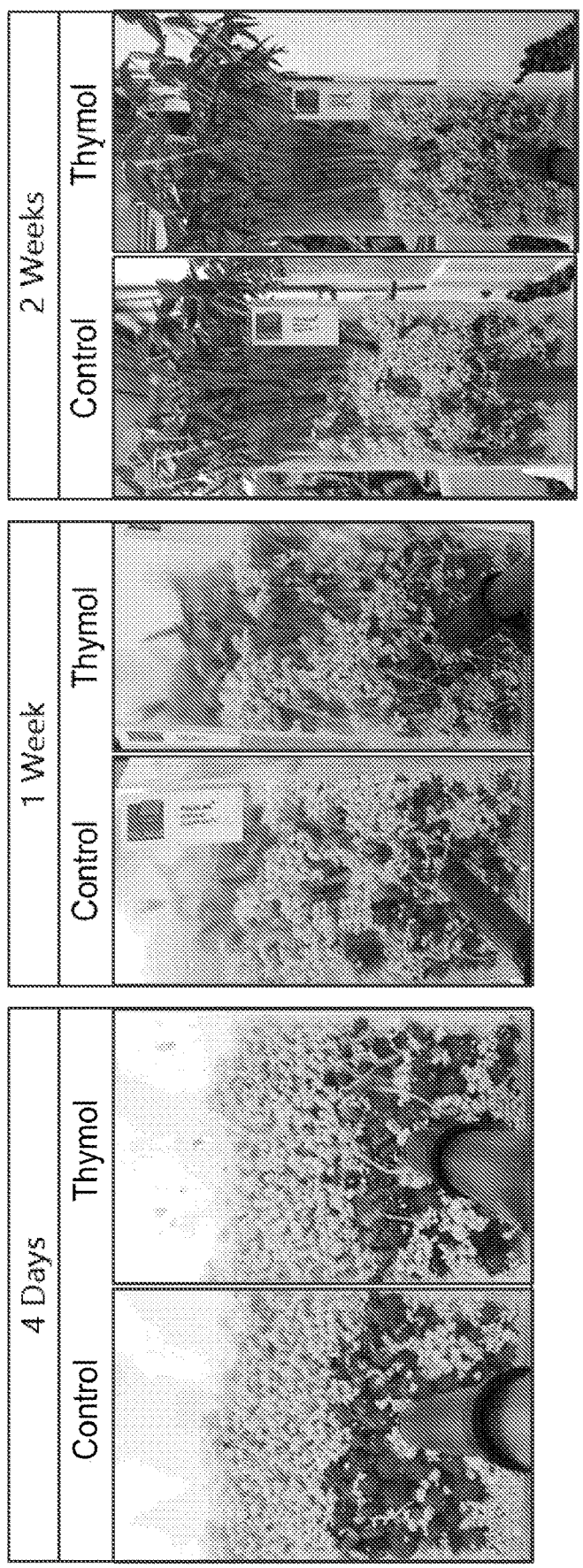
FIG. 4 is a series of photographs illustrating development of mash bean seeds in control and experimental Thymol-treated planters at 4 days, 1 week and 2 weeks.

As the days progressed, it also was noticeable that the growth rate of roots and seedlings was faster in the T-planter, leading to a more abundant appearance and higher plants relative to the R-planter [FIG. 4; after two weeks, arrows mark the planter threshold].

Figure 5:
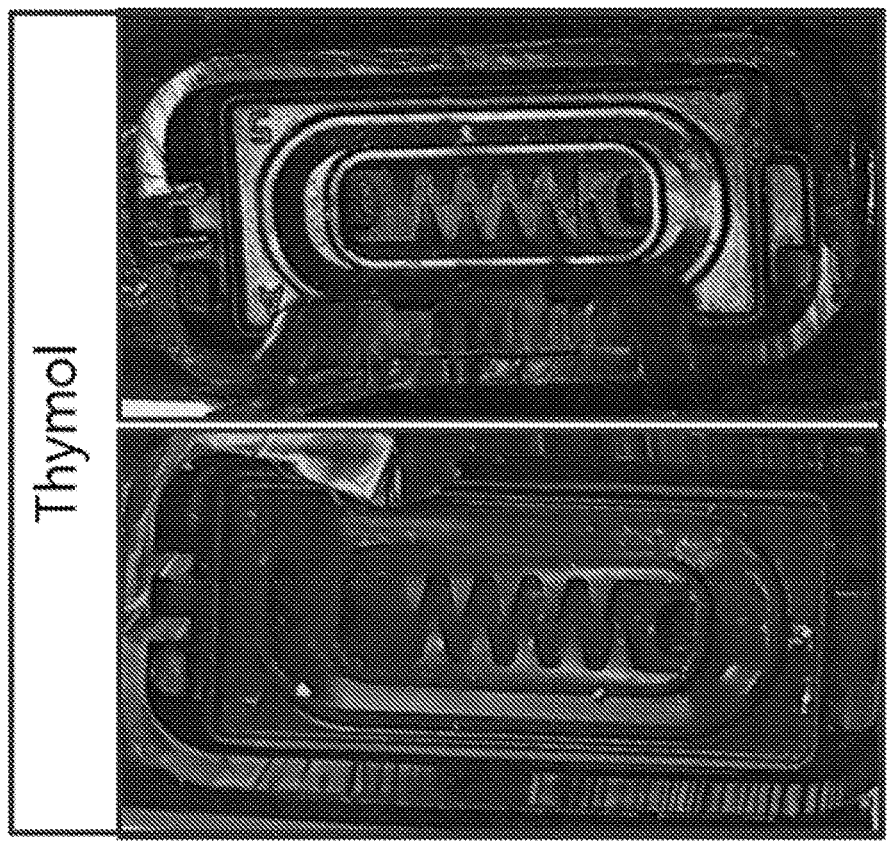
FIG. 5 is a series of photographs illustrating root invasion (dashed circles) in drippers from control planter (left) and lack of root invasion in experimental Thymol-treated planter (right) from the experiment of FIG. 4.
Figure 5:
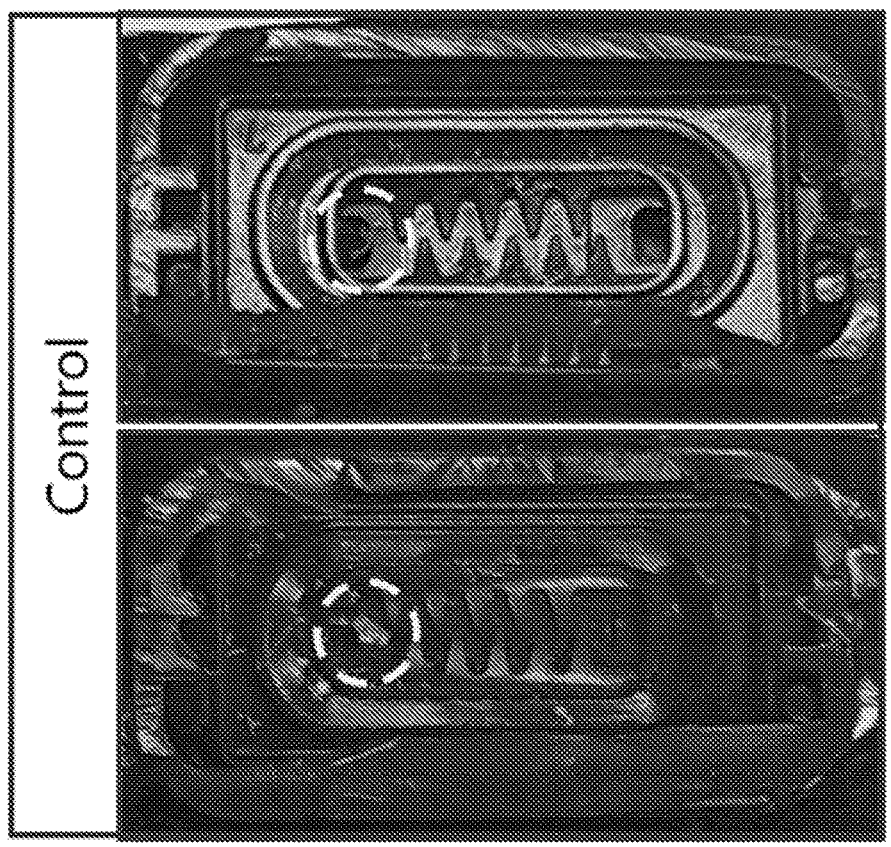

When the drippers were opened, despite the lack of space, the drippers in the T-planter remained free of roots compared to the drippers in the R-planter, which had begun to show root penetration [FIG. 5].

In this example the lack of space for the roots to develop was the only factor that encouraged the roots to penetrate the drippers' cavity. The planting substrate was perlite, inert, and porous material, with a high water-absorbing ability. Since this substrate does not adsorb any organic compound, it increases reliability for the determination of the EOs inhibitory effect. In addition, irrigation times were long enough to keep the perlite substrate wet until the next irrigation cycle. As a result there was no 'starvation' condition encouraging roots to migrate toward the drippers' holes.

These results suggest that Thymol deterred and/or repelled the roots from growing towards or into the water outlet openings of the drippers.

Example 2

Greenhouse Experiment Using Sorghum and 5% Thymol

In order to confirm the results of Example 1 in a more agricultural settind and in a different pant variety, Sorghum seeds were grown in a TROPICO-type greenhouse (TOP Company), at Kibbutz Metzer (Israel) during the summer season, for 2.5 months.

Individual PP (polypropylene) cases were built for seed beds, with the dimensions of 40 cm height, 20 cm width, and 5 meters length. ARC1-based active films were inserted into PE SDI pipes as in Example 1, and activity of thymol as a root inhibitor was compared to that of TREFLAN chemical herbicide (positive control), as well as to herbicide free pipe used as a negative control.

The pipes were placed 15 cm above the bed's bottom, mimicking a buried drip irrigation situation at a realistic 'field depth' for the SDI system. Holes were drilled at the bed's edges to allow easy access to the initial and the last pipe and to enable simple irrigation and fertilization control.

The seed beds were filled with 'Ram 8'-type (Tuff Merom Golan), a professional planting substrate, 80% coarse peat/ 20% coconut composition.

"Bulldozer"-type sorghum seeds, supplied by CTS Company, were sown. Sorghum is categorized as a classical field-growth plant and characterized by a robust and aggressive root system with secondary growth ability after 'green' harvesting without inflorescence.

The sowing process corresponded to field sowing. Eight seeds per meter were sown at 2.5 cm deep, with 12.5 cm sowing intervals.

Irrigation regime was determined differentially, taking into consideration climate data and irrigation type. During the first week from sowing, the irrigation carried out using sprinklers without fertilization. After sprouting and germination, the irrigation was performed through underground drip irrigation only, accompanied by proportional fertilization, "fertilizer-all"-type 17-10-27, with trace elements. The level of fertilizer in irrigation water was about 30 ppm nitrogen. In contrast to example 1, irrigation and fertilization regimes performed were minimal to create 'starvation' and cause the roots to aggressively migrate towards the drippers' holes in search of water and fertilizer.

In contrast to Example 1, which was conducted in a laboratory, this greenhouse experiment simulates 'field' conditions and should therefore be a better indicator of the efficacy of Thymol as a root-repellent agent in actual agricultural practice.

During the two and a half month experiment, two crop cycles took place and all the crops in the different treatments showed uniformity in the rate of growth and development.

Figure 6:
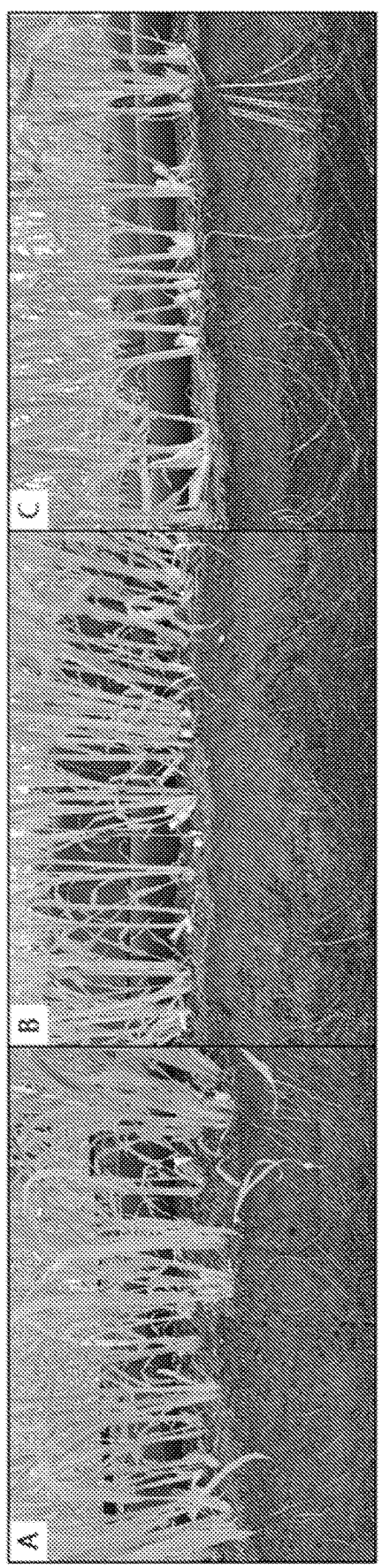
FIG. 6 is a series of photographs illustrating degree of soil moisture in negative control dripline (A), experimental dripline containing a Thymol-based active film (B) and positive control dripline containing TREFLAN(C)

Beds were opened at the end of the experiment and the first difference that was seen was in the soil moisture in the pipe area [FIG. 6].

The soil in proximity to drippers in the negative control seed beds showed the lowest moisture level, while the soil in proximity to drippers containing Treflan (positive control) showed a higher degree of moisture [FIG. 6; A and C, respectively].

Figure 7:
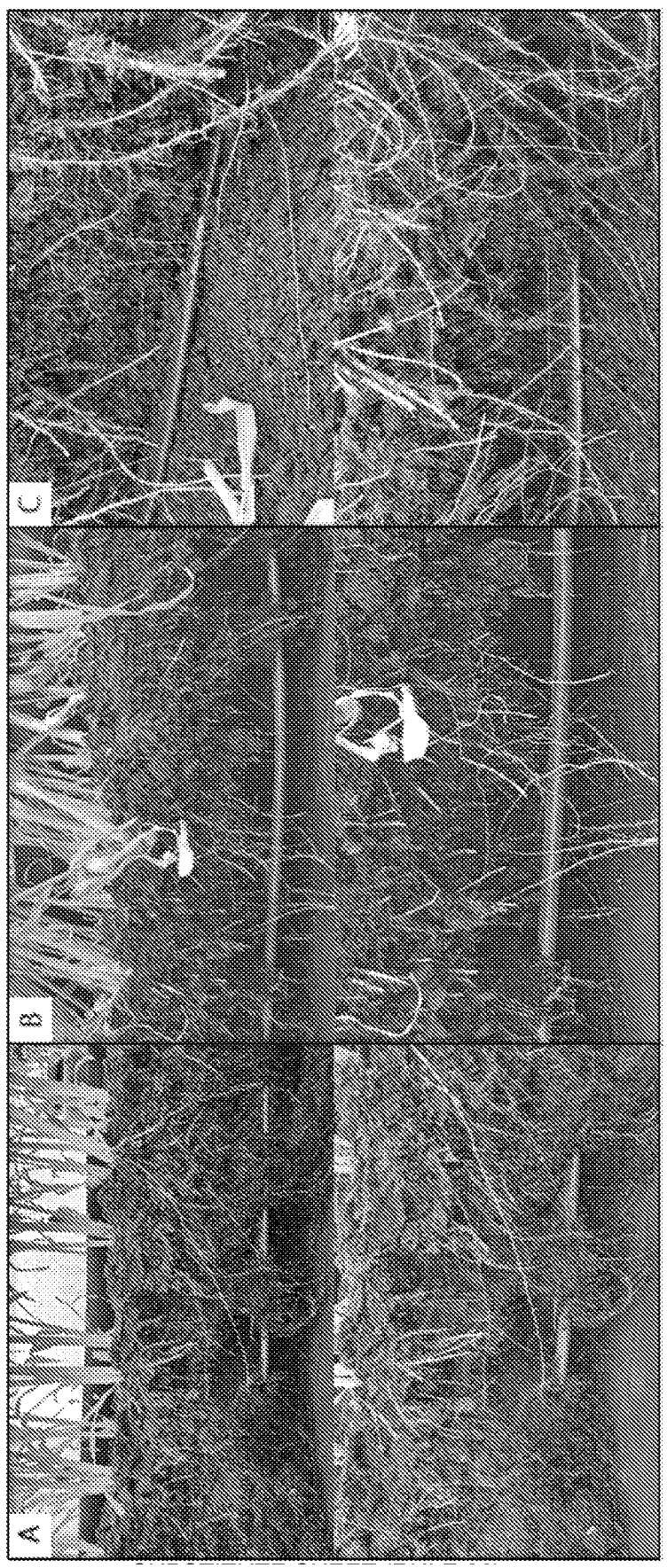
FIG. 7 is a series of photographs illustrating the relative amount of roots accumulated near dripper's orifice in negative control dripline (A), experimental dripline containing a Thymol-based active film (B) and positive control dripline containing TREFLAN(C)

According to FIG. 7, it can be seen that the difference in the soil's humidity in proximity to the drippers correlates to the amount of roots clogging drippers' holes. The number of roots collected in the area of the drippers' holes in negative control treatment was the highest [FIG. 7A]. In stark contrast, in the positive control Treflan drippers, no root concentration areas are observed on top of the pipe [FIG. 7C].

Figure 8:
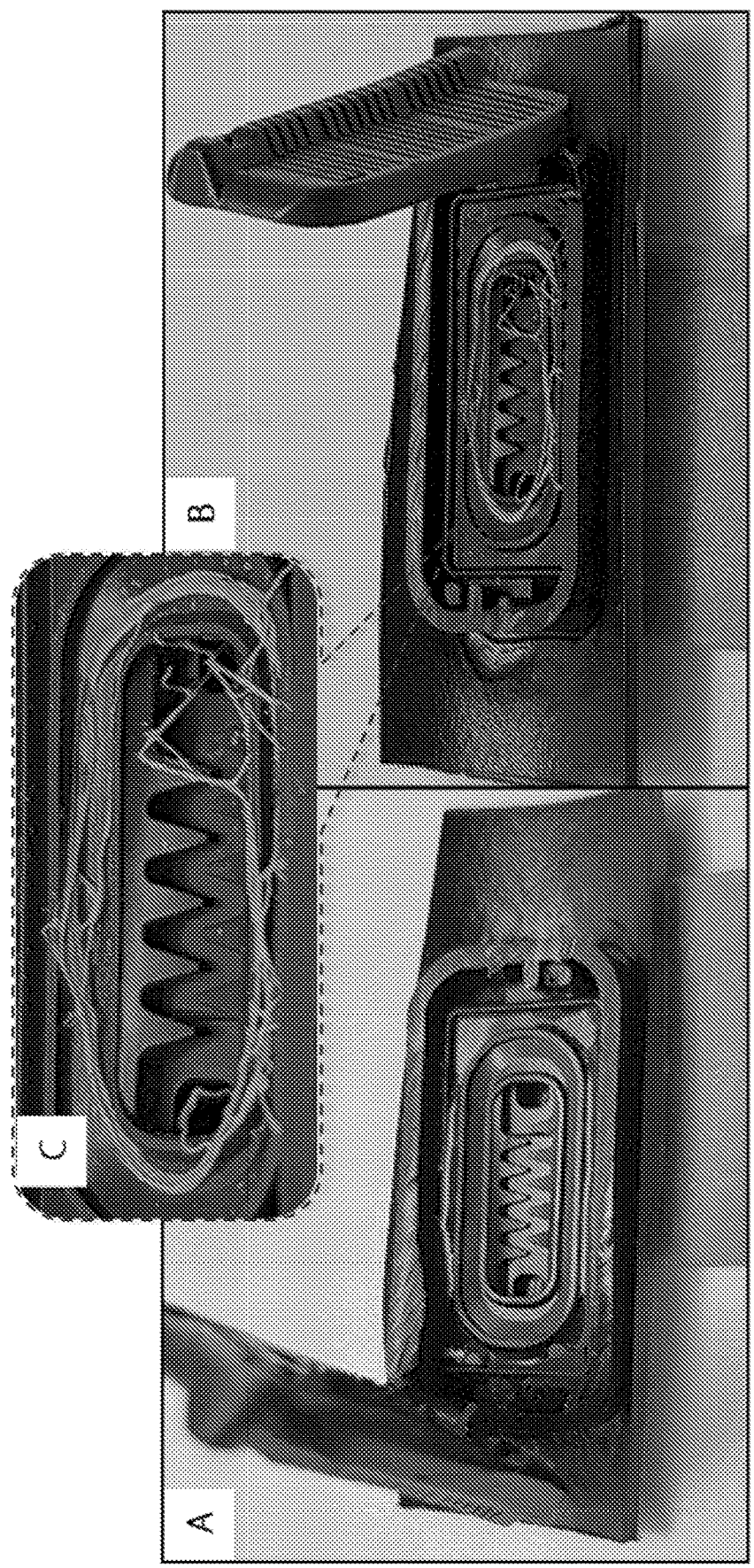
FIG. 8 is a series of photographs illustrating open drippers with a clean dripper (A), a clogged dripper (B) and a magnification of B in (C)

In the experimental group using Thymol (two planters; indicated as Thymol 1 and Thymol 2 in Table 1 below) the number of roots piled up on top of the pipe was lower than that obtained for the negative control and some of the drippers were visible [FIG. 7B]. Most of the drippers that showed root intrusion were in the negative control group [FIG. 8]. Only one dripper was clogged in the experimental an Thymol planter.

The drippers of positive control Treflan planter were root-clean, but with a more aggressive and detrimental effect on roots development [Table 1].

TABLE 1

The number of clogged and clean drippers in each treatment.

| | Treatment type | | | |
| --- | --- | --- | --- | --- |
| | (−) Control | Thymol 1 | Thymol 2 | (+) Control Treflan |
| Clogged drippers | 4 | 0 | 1 | 0 |
| Clean drippers | 14 | 15 | 20 | 20 |
| Total tested drippers | 18 | 15 | 21 | 20 |
| % Clogged drippers | 22.2% | 0% | 4.76% | 0% |

The results of Example 2 confirm that Thymol deterred and/or repelled the roots from growing towards or into the water outlet openings of the drippers as suggested in Example 1 and demonstrate that Thymol is roughly as effective as Treflan in this regard.

In addition, the results of Example 2 provide subjective evidence that Thymol is less harmful to the crop under cultivation than Treflan.

Example 3

*Helianthus* Seeds in Planters with 7% Thymol

In order to evaluate the effect of increasing the amount of Thymol, an additional experiment was conducted using ARC2 polymer (Cloisite 15A 10 wt % nanoclay; 7% Thymol). The experiment was conducted on *helianthus* seeds during the summer season, temperature above 30° C., for two months.

Planter dimensions were 110 cm length, 10 cm width, and 15 cm height. The pipes were placed 5 cm from the planter base, where holes were drilled for drainage.

One planter contained negative control pipe, while ARC2-based active film (experimental) was inserted to pipe in experimental planters as in examples 1 and 2.

Potting soil for plant growth was a mixture of German Kalsmann peat, coconut fiber, ventilation materials, and slow-release fertilizers, mixed with Perlite.

Thirty seeds were sown in two columns at 1 cm depth and 7 cm intervals.

Irrigation cycle was set twice daily for three minutes.

As in previous examples, the number of seeds sown relative to the planter size was large and irrigation regime was minimal to increase the root-intrusion tendency.

Germination rate of the *helianthus* seeds seed experiment experimental ARC2 was faster than the negative control planter [FIG. 3.8]. Seedling growth rate remained faster in the experimental planter than the control planter until the plants reached their maximum height.

Figure 9:
FIG. 9 is a series of photographs illustrating development of *helianthus* seeds seeds in control (right side) and experimental Thymol-treated (left side) planters at 7 days, 11 days, 16 days, 20 days, 38 days and 55 days.
Figure 10:
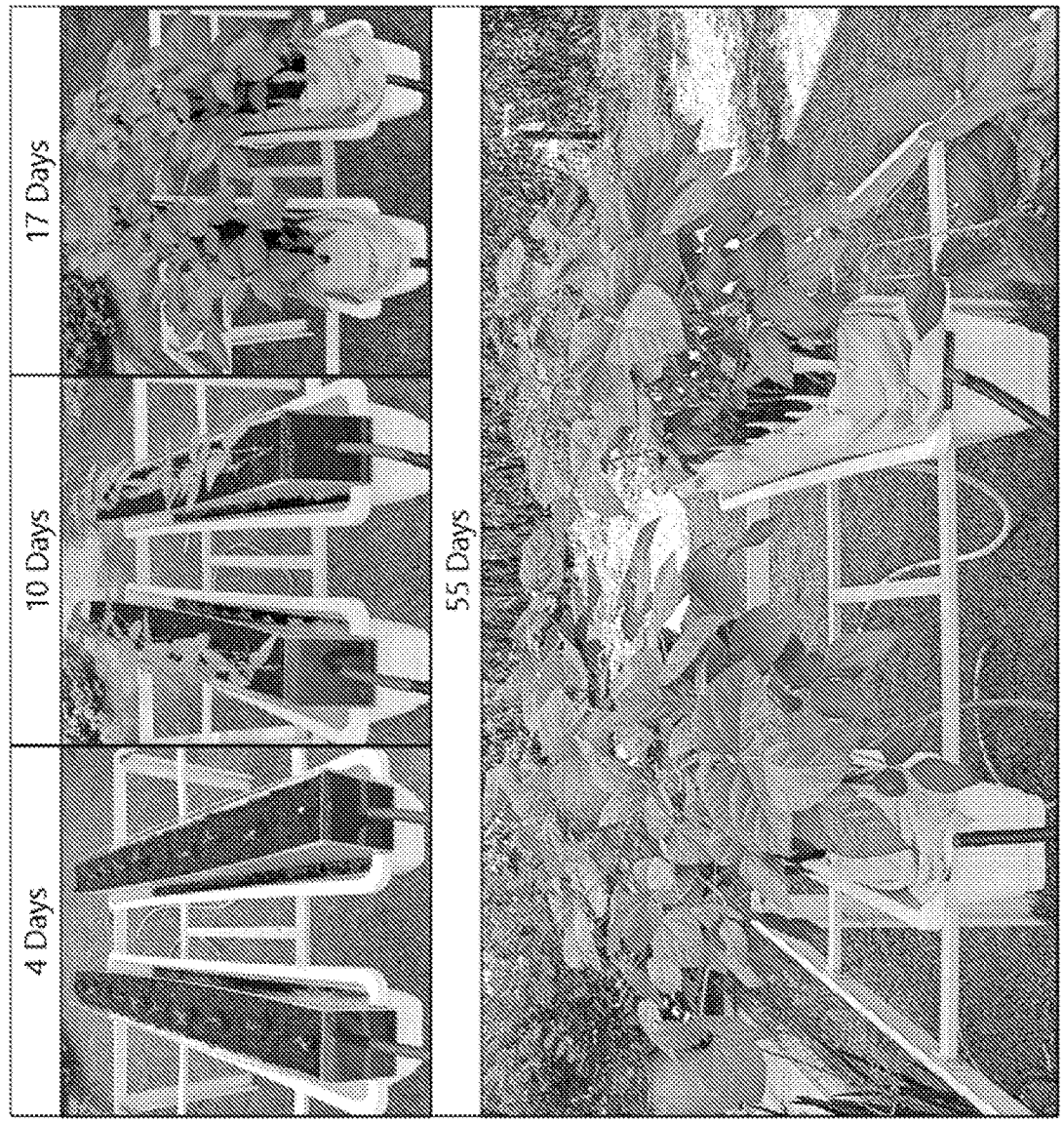
FIG. 10 is a series of photographs illustrating development of mash bean seeds in control (right side) and experimental Thymol-treated (left side) planters at 4 days, 10 days, 17 days, and 55 days.
Figure 11:
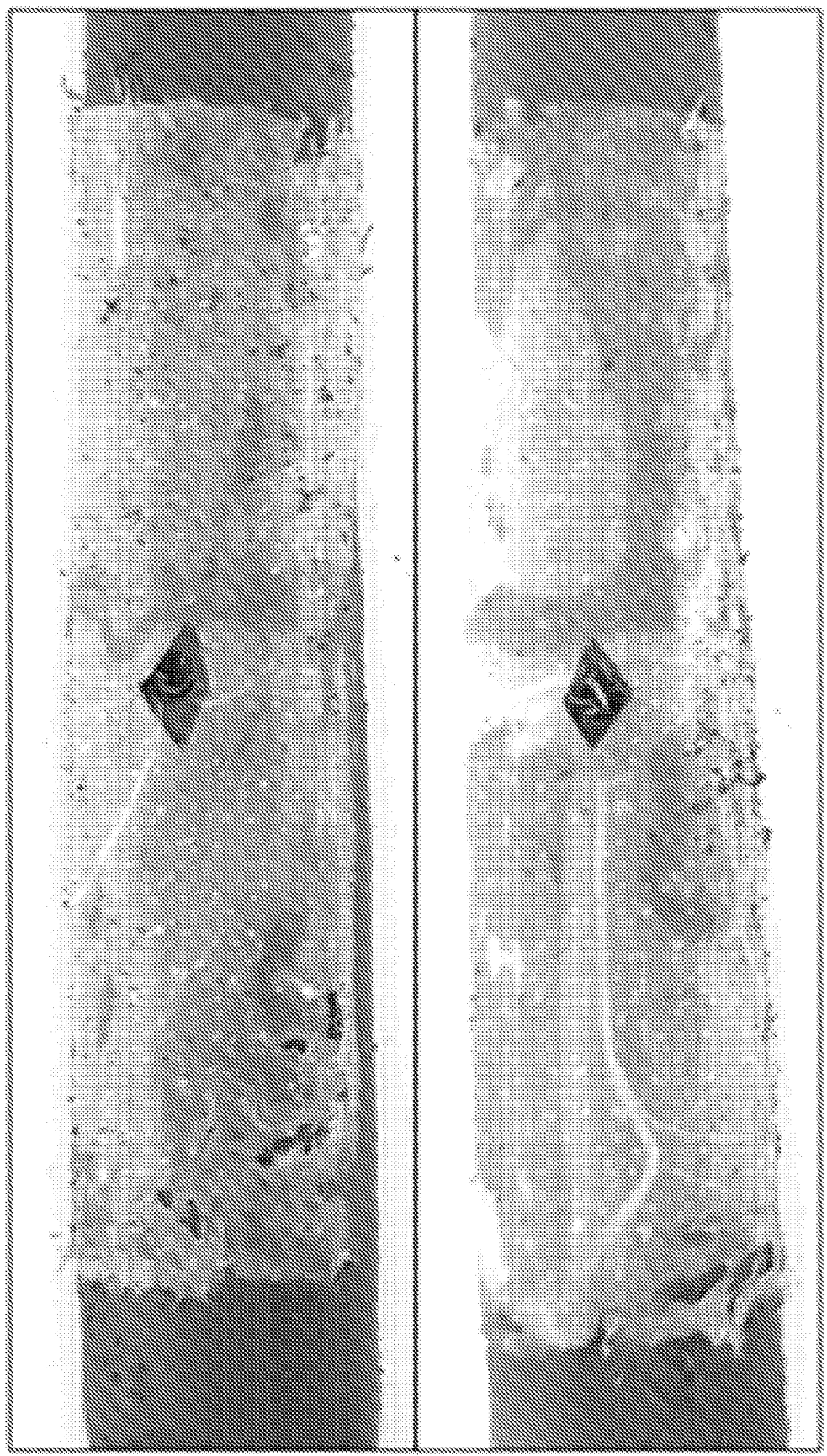
FIG. 11 is a series of photographs illustrating roots invasion to dripper's orifices around welded Thymol-based active films.

Although there was no difference between control an experimental planters until the bloom, the number of *helianthus* flowers in the experimental planter was greater than those in the control planter [FIG. 9; after 55 days, 24 vs. 19, respectively].

At the end of the experiment drippers were examined and roots penetrateed two drippers out of five of the experimental planter as opposed to three out of five in the control planter. These results are consistent with the results of Examples 1 and 2, although not as dramatic.

Example 4

Bioassay of the Thymol Activity on Plant Health and Development

In order to determine the suitability of Thymol as an anti-root (AR) agent in a variety of agricultural settings, Thymol activity was tested on different seed types.

The experiment was conducted for two months during the spring with an ambient temperature of ±30° C. Plastic boxes of 30 cm length, 20 cm width, and 15 cm height were filled with German Kalsmann peat, coconut fiber, ventilation materials, and slow-release fertilizers as planting substrate.

Figure 12:
FIG. 12 is a photograph of Thymol-based active film (circled) placed adjacent to a planter box's wall.

Cucumber, tomato, beetroot, and sweet corn seeds were each sown in two boxes (8 boxes in total); one box of each seed type was used as a negative control and in the other box (experimental) an ARC2-based active film (Cloisite 15A 10 wt % nanoclay; 7% Thymol) was placed adjacent to the box wall to assess Thymol activity [FIG. 12]. The film folded in half, corresponding to the length and width dimensions of the box.

For each seed type, both boxes were placed outdoors according to the sun intensity the plant requires. Each seed type was given an appropriate amount of water evenly, using a can.

Figure 13:
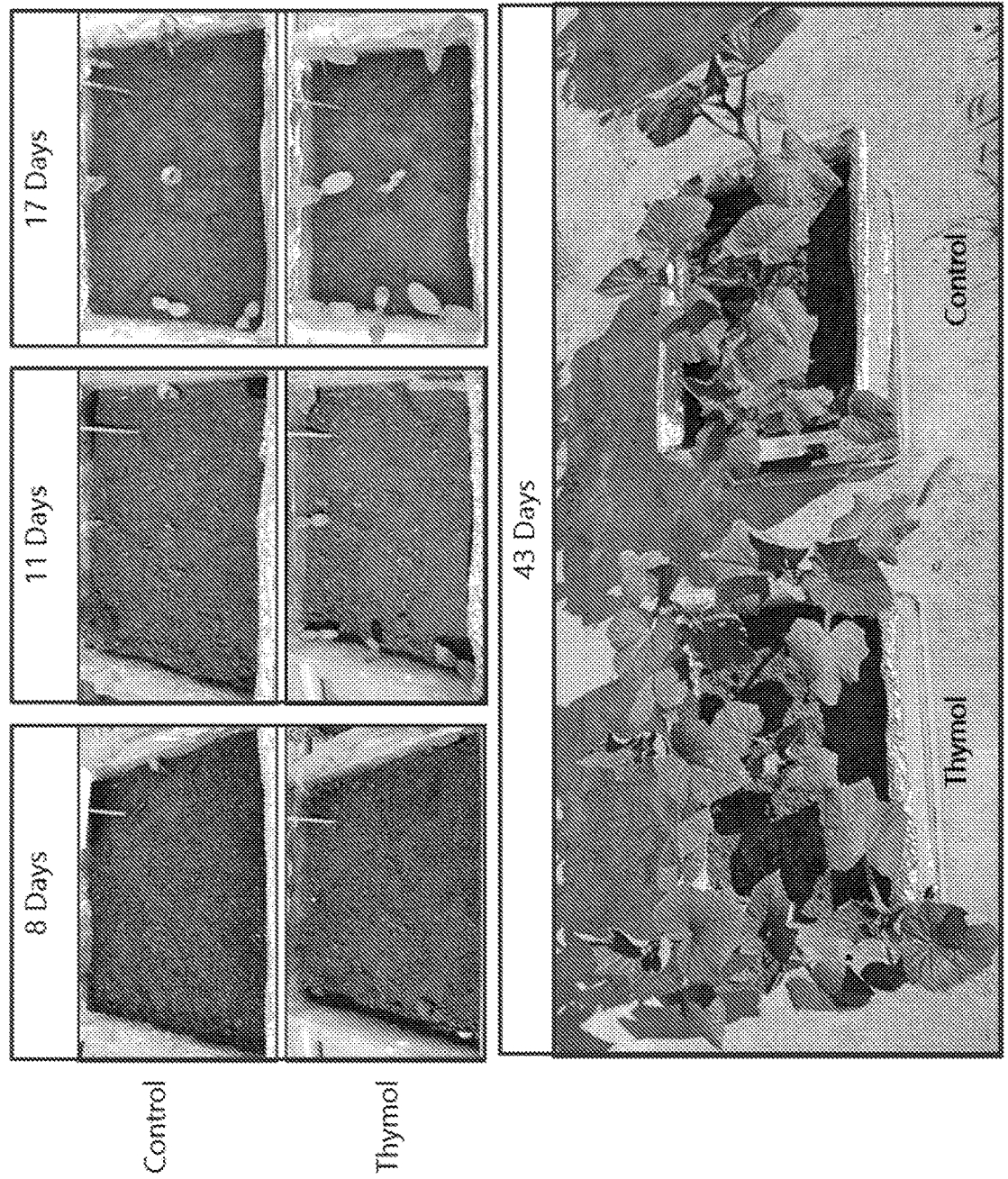
FIG. 13 is a series of photographs illustrating development of cucumber seeds in control (top or right) and experimental Thymol-treated (bottom or left) planters at 8 days, 11 days, 17 days and 43 days.
Figure 14:
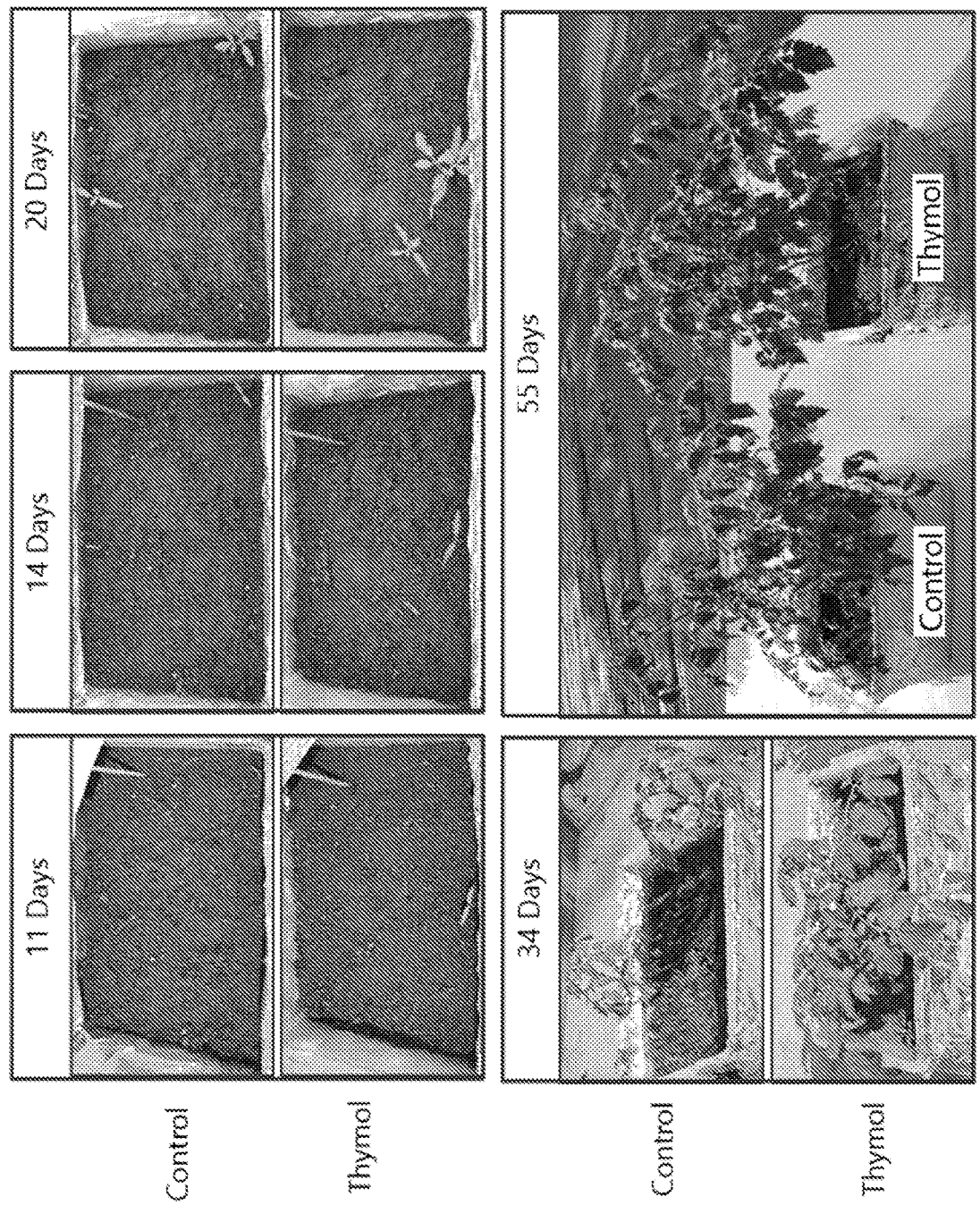
FIG. 14 is a series of photographs illustrating development of sweet corn seeds in control (top or left) and experimental Thymol-treated (bottom or right) planters at 11 days, 14 days, 20 days, 34 days, and 55 days.
Figure 15:
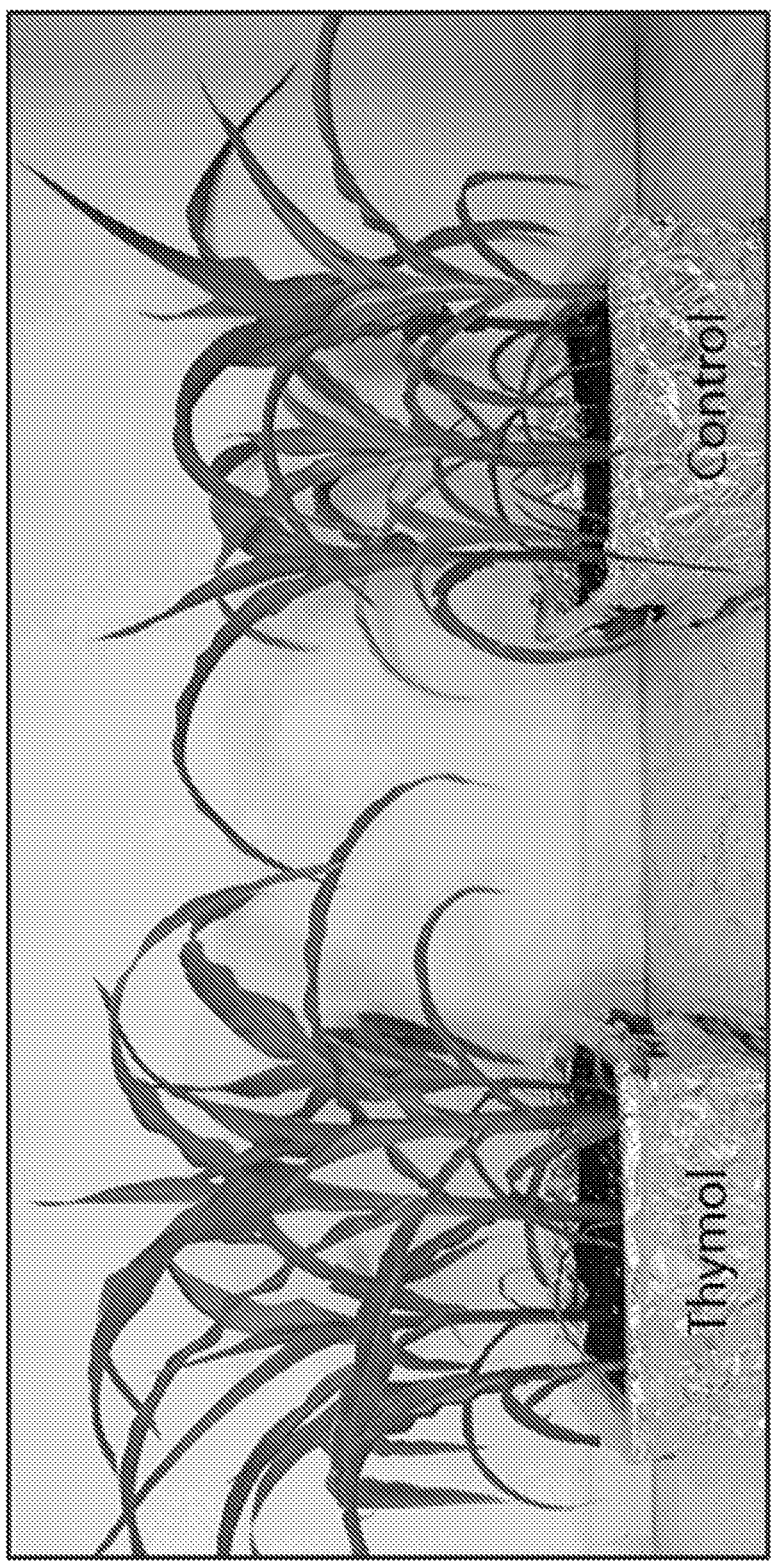
FIG. 15 is a photograph illustrating development of sweet corn seeds in control (right) and experimental Thymol-treated (left) planters at 43 days.
Figure 16:
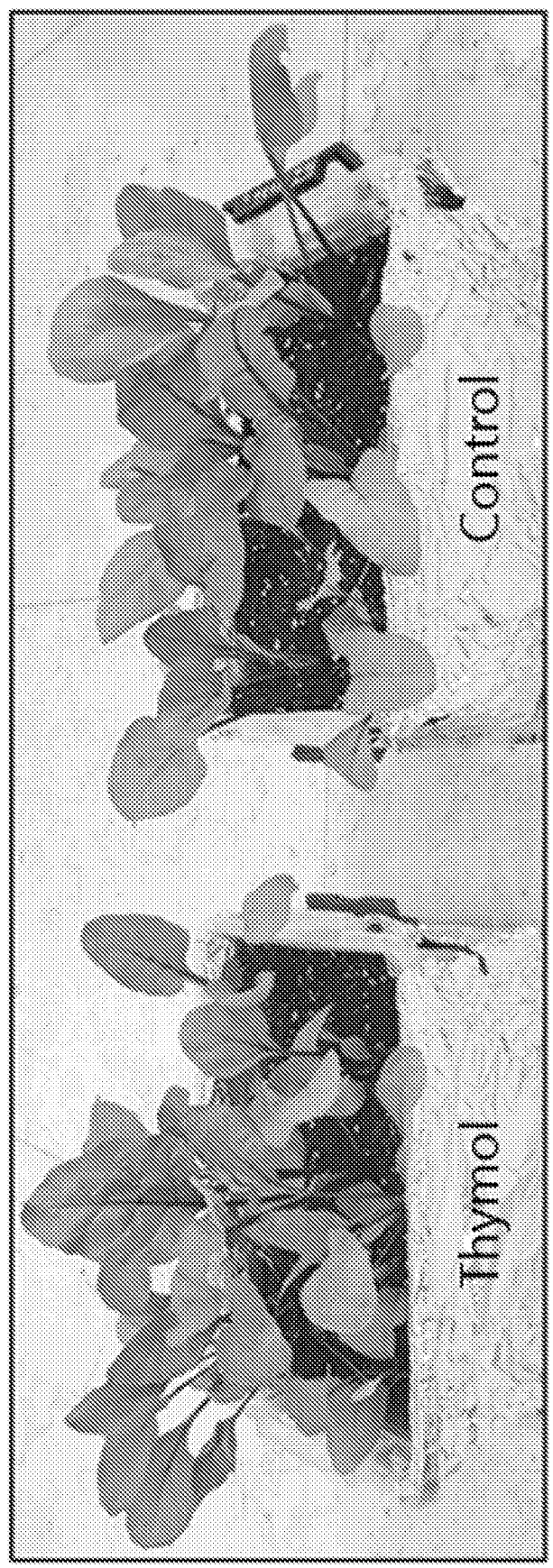
FIG. 16 is a photograph illustrating development of beetroot seeds in control (right) and experimental Thymol-treated (left) planters at 43 days.

FIG. 13; FIG. 14, FIG. 15 and FIG. 16 show the germination and growth of cucumber, tomato, sweet corn, and beetroot seeds respectively. These figures indicate that the germination rate of the seeds in the experimental box with Thymol-based active film was faster.

In addition, the number of germinated seeds in the experimental box with Thymol-based active film was greater compared to the control box [FIG. 13; 6 seeds after 11 days vs. 17 days, respectively].

In addition, the seedlings' growth rate continued to be faster in the experimental box with Thymol-based active film, and the plants spread over a wider area [FIG. 13; after 43 days].

FIG. 17 is a bar graph illustrating the relationship between the amount of EO in the polymer sheets placed in the seedbeds of tomato, corn, etc., and between polymer sheets welded outside the SDI pipes in an experiment with beans (data not shown).

In both cases it appeared that low EO concentrations encouraged growth while higher concentrations inhibited growth.

Cumulative data from examples 1 through 4 suggests that Thymol can stimulate root growth, which could theoretically lead to intrusion of drippers of SDI pipes, at low concentrations (<0.4 wt %), while at higher concentrations Thymol has an AR activity that deters intrusion of drippers of SDI pipes.

Example 5

Quantitative Analysis of the Thymol Concentration in the Film

The amount of Thymol remaining in the films immediately after processing and at the end of each experiment was determined by UV-visible 1650PC spectrophotometer (Shimadzu), through extraction. The procedure is suitable for different phenolic EOs and is based on Gibbs reagent (2,6-dichlorobenzoquinone 4-chloroimine).

Briefly, different Thymol-active films were cut to small pieces, weighed, and extracted by refluxing with 2-propanol at a ratio of 500 mg film/25 ml propanol, for 2 hours. To 100 ml volumetric flasks containing 10 ml of a standard Buffer solution of Boric Acid+Potassium Chloride, 1 ml of the extraction solution, 4 mL of 2-propanol, and 1 ml of Gibbs reagent solution was added. The solution was allowed to stand for 15 min to enable the reaction to occur fully. The resulting violet water-soluble dye has a maximum absorption at 590 nm wavelength. Thymol concentration retained in the film, as a proportion of the nominal concentration, was calculated from a calibration curve. Two replicates were measured for each standard.

FIG. 17 shows the percentage of Thymol EO remaining in the film immediately after processing and at the end of each experiment relative to the initial EO concentration absorbed.

Figure 17A:
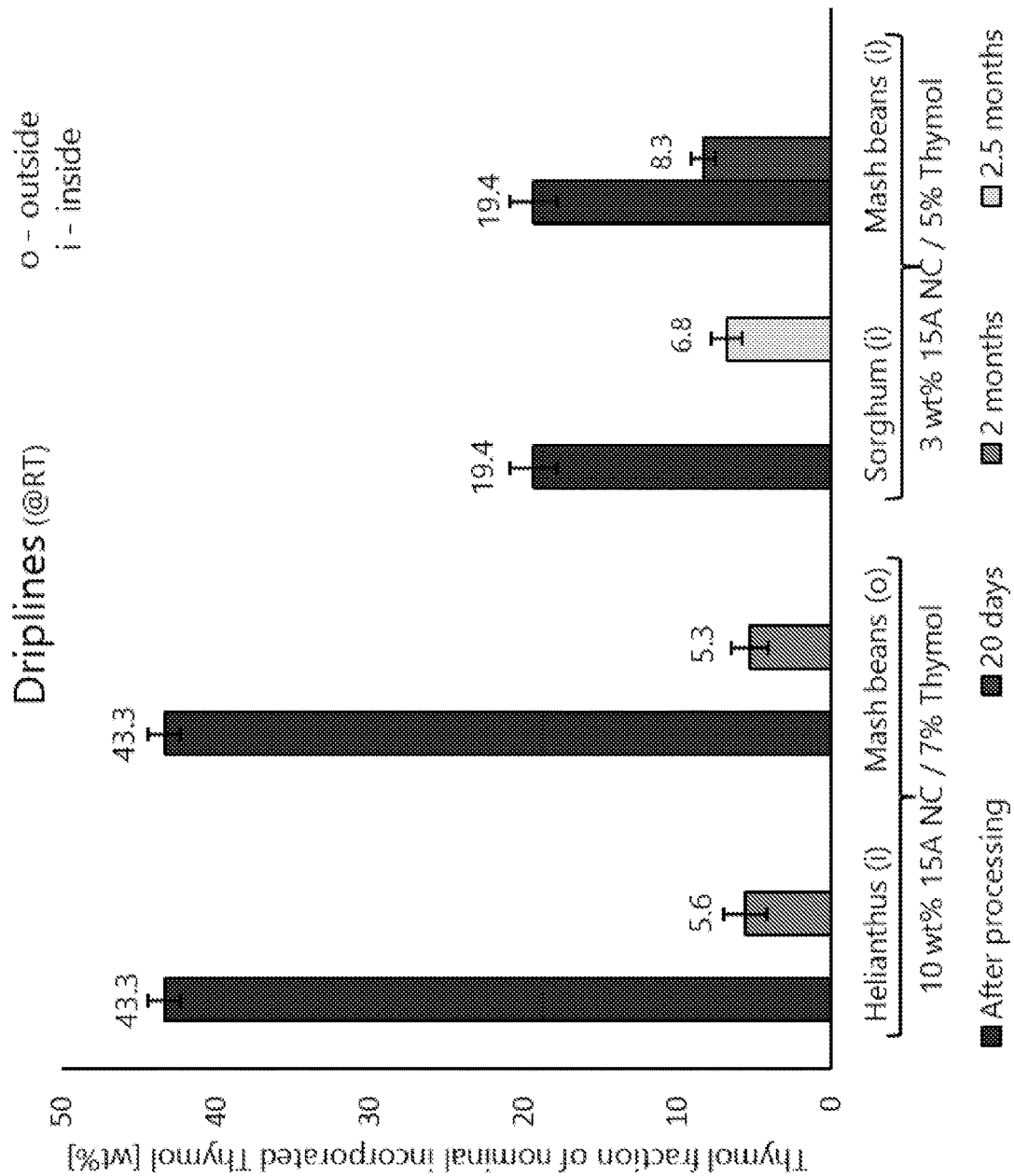
FIG. 17 is a bar graph illustrating fraction of nominal incorporated thymol remaining in films as a function of time.

Results presented in FIG. 17A indicate that as the wt % NCs in the system increased, the amount of Thymol remaining in the film after processing was larger.

Additionally the amount of Thymol left in the film was smaller as the extraction took place later. The amount of Thymol remained in the film after two months was relatively the same, although the location of the film was different; in the experiment on the *helianthus* seeds and the mash bean seed experiment of Example 1, the film was inserted into the pipe [FIG. 17A], with the mash bean seeds (data not shown), the film was welded onto the pipeline [FIGS. 17A and 17B] while in tests on the new seeds (cucumber, tomato, sweet corn, and beetroot seeds), the film was placed adjacent to the plastic box wall [FIG. 17B].

Figure 17B:
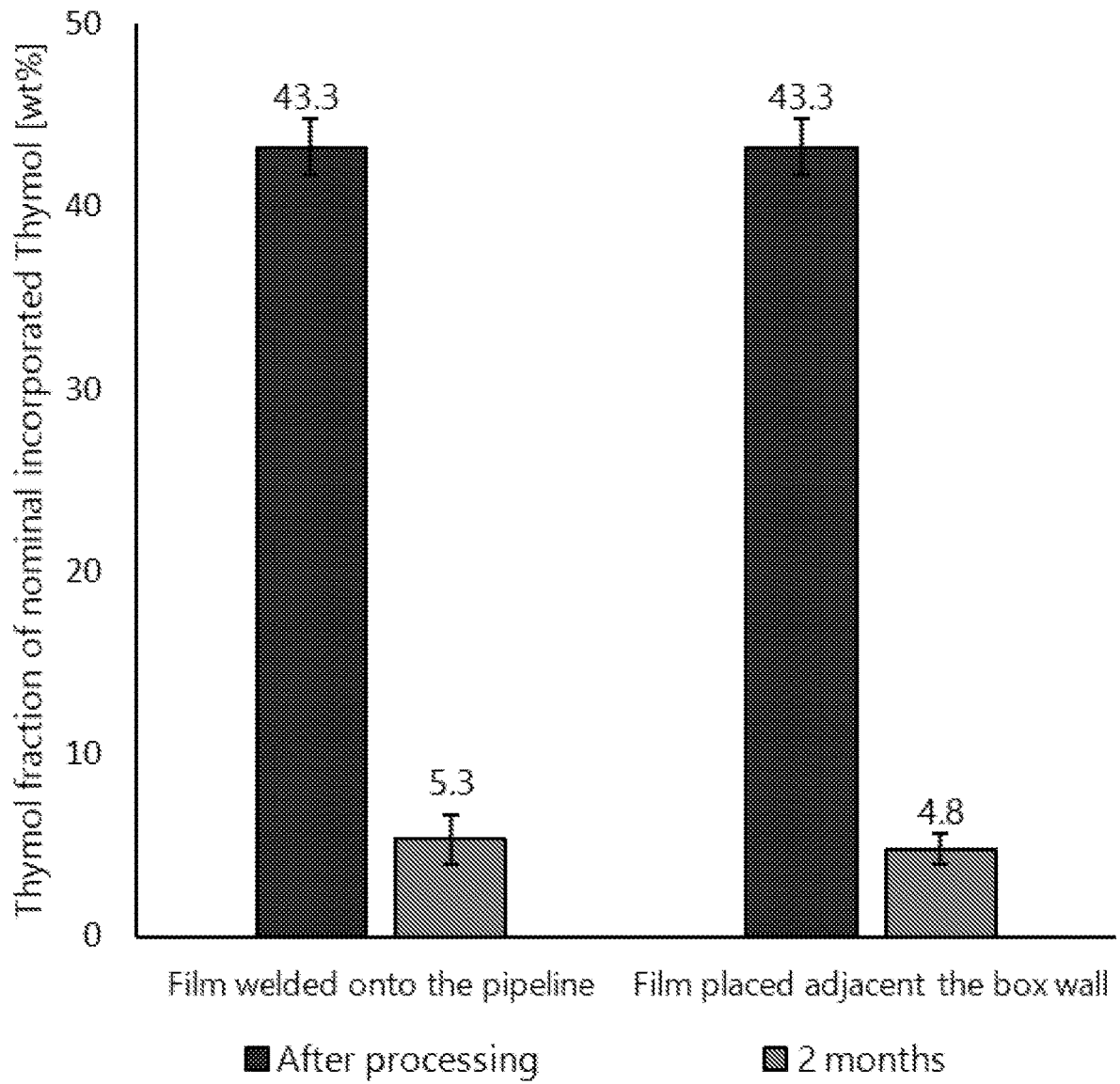

Results presented in FIGS. 17A and 17B indicate that after 2 months in soil, the mount of Thymol remaining in the film was around 5% of the amount nominally incorporated in the film prior to processing, regardless of whether the film was inserted into the piped, welded to the outside of the pipe, or placed at a distance from the pipe. However, in experiments in which the polymer containing EO was inside the SDI pipe, the root inhibition was greater.

Cumulative subjective and quantitative results of examples 1 through 5 suggest that water starvation and/or a decrease in the concentration of Thymol in the film contribute to a reduction in Thymol's ability to prevent root intrusion.

When Thymol concentration in the film starts to drop from about 9% of the initial concentration at the beginning of the manufacturing process, inhibitory activity of Thymol decreases and it is no longer powerful enough to prevent root invasion in the drippers.

Release of Thymol from the film occurs over time so that the concentration in the film decreases over time.

Thymol concentration remaining in the film after two and a half months in the sorghum experiment was slightly higher than after two months in the mash bean experiment. Perhaps due to the difference between having the thymol containing film inside or outside the pipe. Alternatively or additionally, the experiment lasting two and a half months was carried out in a greenhouse where climate can be controlled while in the experiment that lasted two months, the planters were under direct sun conditions and higher temperatures, either of which could accelerate the diffusion rate and/or evaporation of Thymol resulting in a lower concentration.

Taken in toto, these results suggest that when the Thymol-active film was inside the subsurface pipe, the water flowing carried Thymol molecules to the vicinity of the drippers' holes creating a concentration gradient with the highest Thymol concentration close to the water outlet openings, enabling inhibitory activity. Farther from the dripper's holes, the low concentration of Thymol apparently had a stimulating effect on seed germination and growth.

When Thymol-active films were welded onto the outside of the pipe, Thymol was released from the film directly into soil so that Thymol molecules did not concentrate in one spot. As a result, concentration of Thymol obtained near the drippers' holes was much lower than when the Thymol containing film was inserted into the pipeline.

Therefore, although the Thymol concentration remaining in the film was similar when the film was on the pipeline in the experiment on the mash bean seeds (data not shown) and when the film was inside the pipe in the experiment on the *helianthus* seeds and the mash bean seed experiment of Example 1., the Thymol potency that was felt by the roots and other parts of the plant was different. It is possible that when the film was welded onto the pipeline, the concentration created close to the dripper's hole was similar to the concentration the seeds and other plant parts felt close to the surface soil in experiments where the film was inserted into the pipeline so that the Thymol encouraged the roots to penetrate the dripper's cavity.

Example 6

Combination of Different Active Ingredients

In order to evaluate the efficacy of Thymol relative to another EO, and to see if combination could result in synergistic activity, an additional experiment was conducted using ARC2 polymer (Cloisite 15A 10 wt % nanoclay) with mash bean seeds in open jars. Cotton wool was placed in the jar as a substrate in the center of which the seeds were sown. Three types of EOs were incorporated into the ARC2 polymer films (7% Thymol, 7% pelargonic acid, and 3.5% Thymol/3.5% pelargonic acid) with a dimension of 1 cm width, 3 cm length, and 3 mm thickness were tested and compared to a reference sample (without EO). Each film was placed adjacent to the jar wall.

Figure 18:
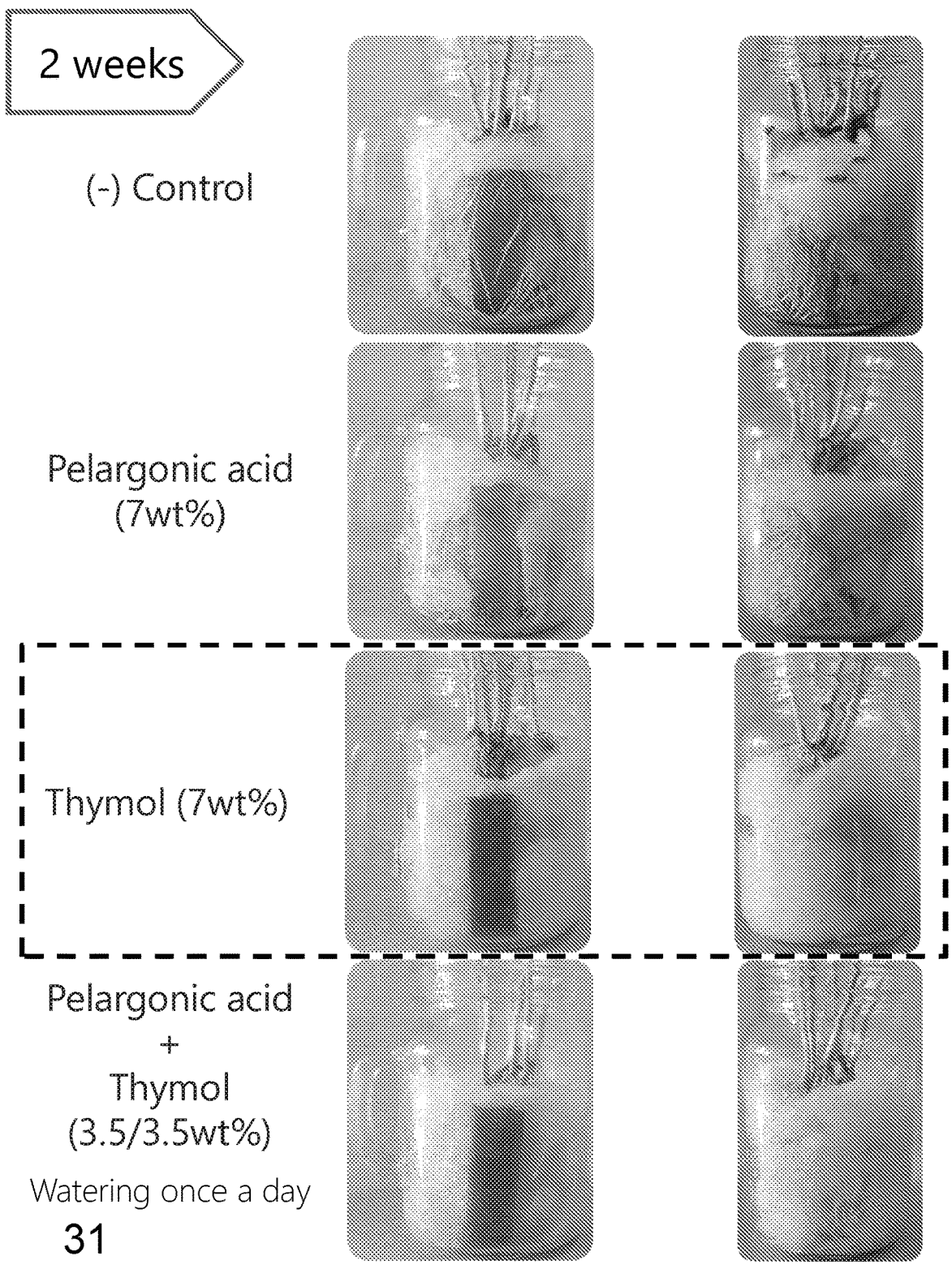
FIG. 18 is a series of photographs illustrating development of Mash bean seed roots in control (top row), 7% Pelargonic acid-treated (second row); 3.5% Thymol/3.5% Pelargonic acid-treated (third row) and 7% Thymol-treated (bottom row) seeds two weeks after planting.

Seeds were watered once a day for 14 weeks. In FIG. 18, each row shows the development of the roots after two weeks. Pelargonic acid alone had an inhibitory effect on root growth compared to the reference sample, but the effect was less than with Thymol alone or Thymol in combination with Pelargonic acid.

Figure 19:
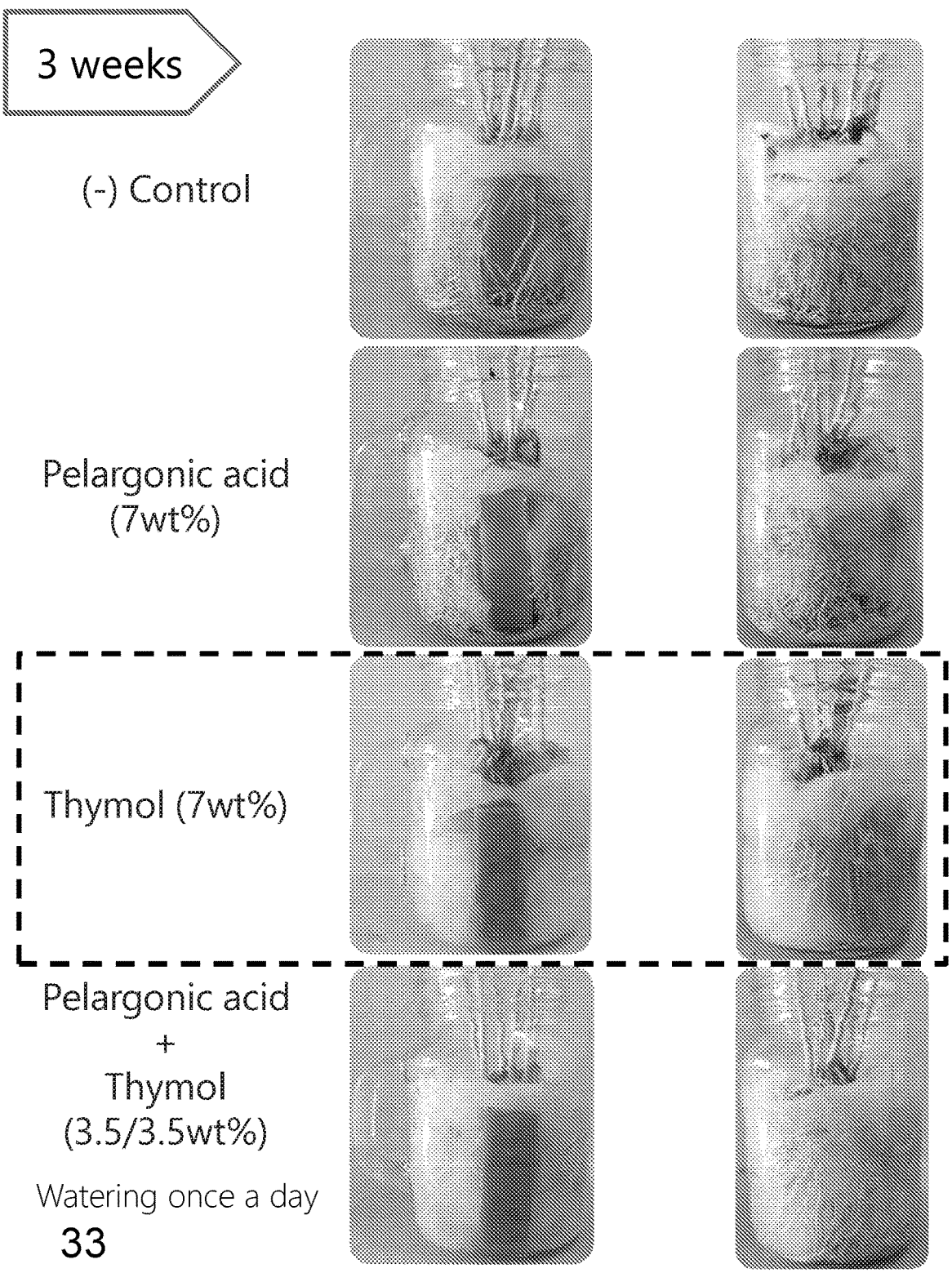
FIG. 19 is a series of photographs illustrating development of the same Mash bean seed roots as in FIG. 18 three weeks after planting.

FIG. 19 shows the development after three weeks. Although the degree of root inhibition declines over time, Thymol alone has the best root inhibitory effect after 3 weeks.

Figure 20B:
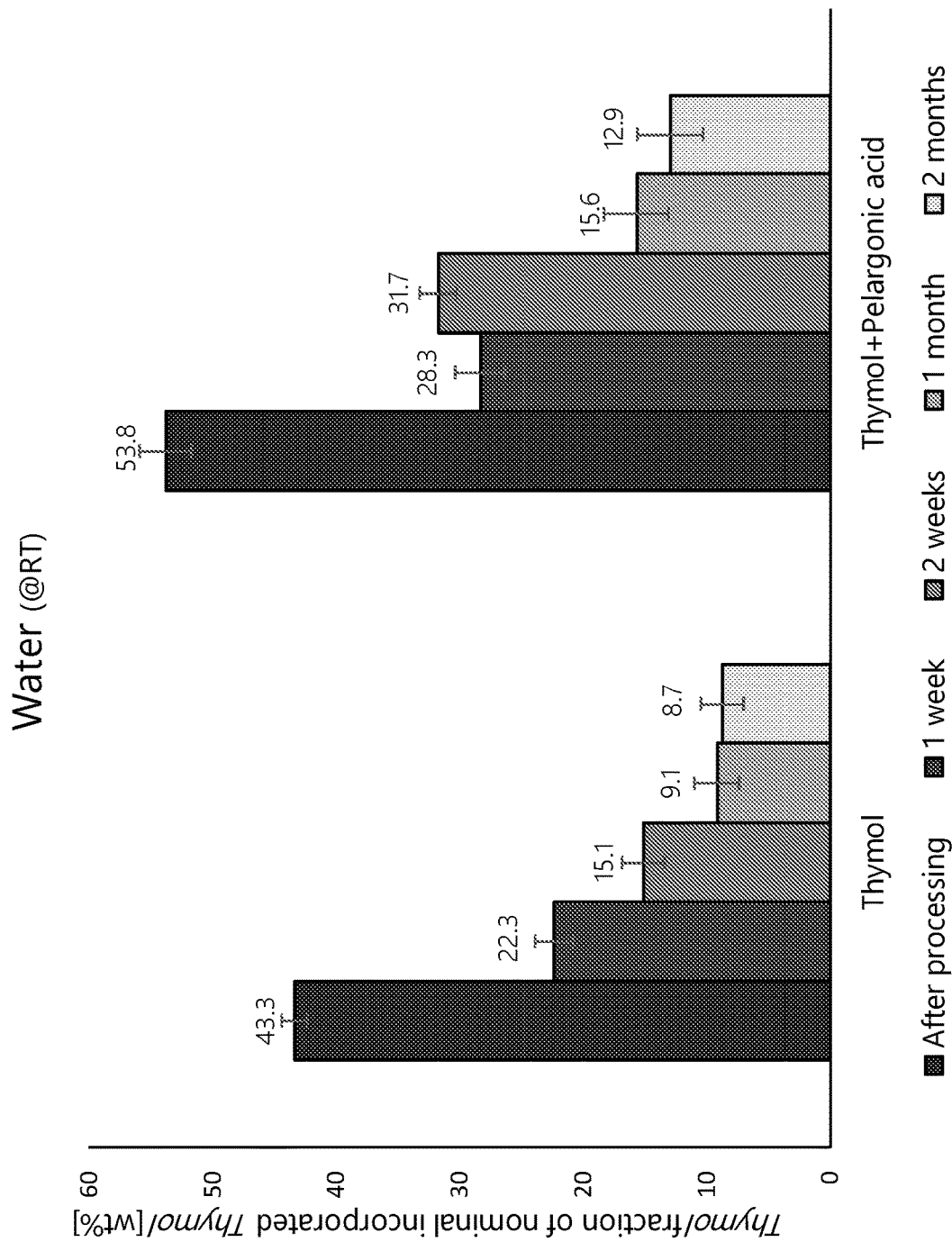
FIG. 20B is a bar graph illustrating % of nominal EO incorporated remaining in polymeric plates as a function of time for 7% thymol ARC2 and 3.5% Thymol/3.5% Pelargonic acid ARC2.

Quantitative analysis of the effect of adding pelargonic acid on Thymol retention time in the polymer plastic is summarized in FIG. 20A and FIG. 20B.

For this experiment, 60 μm thickness films were produced using ARC2 polymer with one containing 7% Thymol and the other combining 3.5% Thymol with 3.5% pelargonic acid. Each film was placed in a vessel with water and the amount of Thymol remaining in the film was tested immediately after processing, after one week, two weeks, one month, and two months (FIG. 20A). In addition, the amount of Thymol remaining in the samples from the experiment on mash bean seeds in the open jars was tested at the end of experiment (after 14 weeks; FIG. 20B).

The results indicate that the combination of Pelargonic acid with Thymol slows release rate of Thymol from the ARC2 film. However, the improvement in retention time came at the expense of Thymol root inhibitory activity. These results suggest that combinations of two or more EOs can have unexpected synergistic effects.

The invention claimed is:

1. A subsurface drip irrigation (SDI) pipe comprising:
   (a) a polymer water conduit with drippers spaced along a length of its wall; and
   (b) one or more essential oils (EO) adsorbed to a nanoclay (NC)/polymer structure forming at least a portion of the SDI pipe so that EO is delivered to soil surrounding the SDI pipe as a sole active ingredient to mitigate root invasion.

2. An SDI pipe according to claim 1, wherein said wall of said conduit includes said NC/polymer with EO adsorbed thereto.

3. An SDI pipe according to claim 1, wherein said NC/polymer with EO adsorbed thereto is inserted as a film surrounded by said wall of said conduit.

4. An SDI pipe according to claim 1, wherein said NC/polymer with EO adsorbed thereto is applied as a coating to an inner side of said wall of said conduit.

5. An SDI pipe according to claim 1, wherein one or more drippers of said SDI pipe comprise NC/polymer with EO adsorbed thereto.

6. An SDI pipe according to claim 1, wherein said NC/polymer with EO adsorbed thereto is applied as a coating to an outer side of said wall of said conduit.

7. An SDI pipe according to claim 1, wherein said NC/polymer with EO adsorbed thereto comprises 3% or more EO.

8. An SDI pipe according to claim 1, wherein said NC/polymer with EO adsorbed thereto comprises 10% or less EO.

9. An SDI pipe according to claim 1, wherein said EO includes one or more members of the group consisting of Thymol, Carvacrol, Eugenol, Pelargonic acid and Cinnamaldehyde.

10. An SDI pipe according to claim 1, wherein said EO includes Thymol.

11. An SDI pipe according to claim 1, wherein said entire pipe is free of herbicides.

12. A method comprising:
   incorporating an essential oil (EO) adsorbed to a nanoclay (NC)/polymer structure as a sole active ingredient to mitigate root invasion in at least a portion of a subsurface drip irrigation (SDI) pipe.

13. A method according to claim 12, wherein said EO includes one or more members of the group consisting of Thymol, Carvacrol, Eugenol, Pelargonic acid and Cinnamaldehyde.

14. A method according to claim 12, wherein said EO includes Thymol.

15. A method according to claim 12, wherein said at least a portion comprises drippers.

16. An irrigation dripper comprising:
   polymer having incorporated therein one or more essential oils adsorbed to a nanoclay/polymer structure without any other active ingredient to mitigate root invasion.

\* \* \* \* \*

UNITED STATES PATENT AND TRADEMARK OFFICE
CERTIFICATE OF CORRECTION

| | | |
|---|---|---|
| PATENT NO. | : 12,089,542 B2 | |
| APPLICATION NO. | : 18/013940 | |
| DATED | : September 17, 2024 | |
| INVENTOR(S) | : Dotan et al. | |

It is certified that error appears in the above-identified patent and that said Letters Patent is hereby corrected as shown below:

On the Title Page

Item (71), in Column 1, in "Applicant", Lines 2-3, delete "Heffer, IL (US)" and insert -- Heffer (IL) --, therefor.

Signed and Sealed this
Nineteenth Day of November, 2024

Katherine Kelly Vidal
*Director of the United States Patent and Trademark Office*